March 21, 1967  J. JURNÝ ETAL  3,309,935
NON-UNIFORM MOTION ESTABLISHING GEARING
Filed July 8, 1964
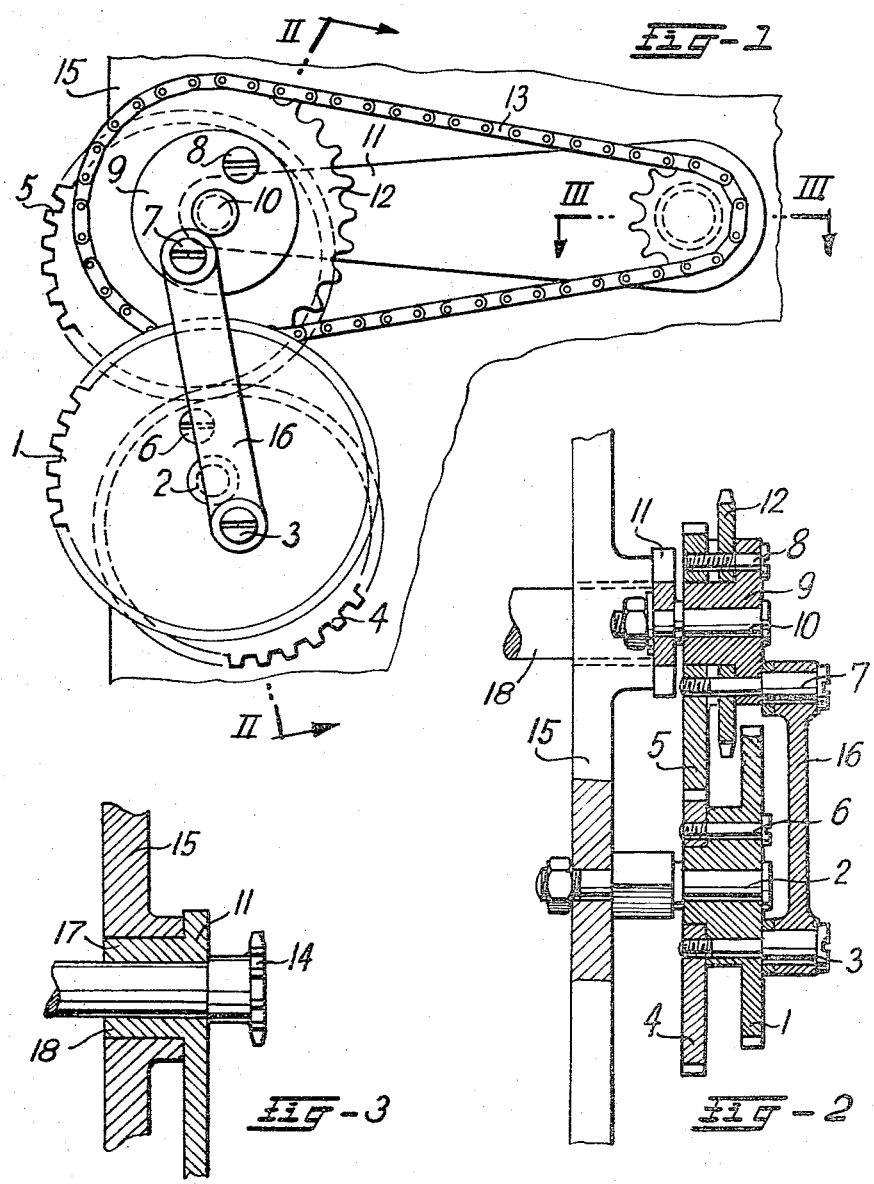
INVENTORS
Josef Jurný, Jaroslav Kovář

United States Patent Office 3,309,935
Patented Mar. 21, 1967

3,309,935
NON-UNIFORM MOTION ESTABLISHING GEARING
Josef Jurný, Sebranice, and Jaroslav Kovář, Sebrov, Czechoslovakia, assignors to Adamovské Strojírny, narodní podnik, adamov u Brno, Czechoslovakia
Filed July 8, 1964, Ser. No. 381,132
Claims priority, application Czechoslovakia, July 15, 1963, 4,069/63
5 Claims. (Cl. 74—393)

This invention relates to a gear transmission for converting uniform rotary motion into a rotary motion whose speed varies cyclically, and particularly to a transmission for use in the paper sheet conveying apparatus of a printing press.

Sheet conveying devices commonly rely on one of two transmission types. In one type, the conversion of uniform rotary motion into a rotary motion of cyclically varying speed is brought about by meshing elliptical gears. Such gears, however, are difficult to produce, and the speed variation is limited by the ratio of the major and minor radii of the gears.

The other known transmission is provided with two gears of which one is mounted eccentrically. The transmission requires a complex system of levers, and the speed variation of the output member is limited by the eccentricity of the aforementioned gears.

The object of the invention is the provision of a transmission operating in the manner described above, but free of the shortcomings of the known devices.

With this object and others in view, the invention mainly resides in a transmission, the input and output members of which are mounted on a support for rotation about fixed axes. A first gear member is mounted on the support about an axis which is eccentric relative to the gear member. One end portion of a rocker arm is secured to the support for pivoting movement about a fixed axis. A second gear member is mounted on the other, free end portion of the rocker arm for rotation about an axis which is eccentric relative to the second gear member.

The first and second gear members are held in meshing engagement by connecting means. Motion is transmitted by operatively interposed elements between the two gear members and the input and output members respectively in such a manner that one gear member is rotated in response to rotation of the input member, and the output member is rotated in response to rotation of the other gear member.

An embodiment of the invention is shown in the attached drawing in which:

FIG. 1 shows a transmission of the invention in front elevation;
FIG. 2 shows the apparatus of FIG. 1 in section on the line II—II; and
FIG. 3 shows the same apparatus in section on the line III—III.

The transmission includes an input wheel 1 which is a spur gear rotatably mounted on the supporting machine frame 15 by means of a stub shaft 2. A partly threaded shoulder pin 3 and a bolt 6 fixedly and eccentrically fasten a spur gear 4 to the input gear 1. The gear 4 meshes with a gear 5 which is fixedly and eccentrically fastened to a sprocket 12 and to the hub 9 of the sprocket by a shoulder pin 7 and a bolt 8.

The sprocket 12 and its hub 9 are coaxially rotatable on a stub shaft 10 mounted on the free end of a rocker arm 11 whose other end carries an integral tubular axle 17 pivotally mounted on the supporting frame 15. The output shaft 18 of the transmission is coaxially journaled in the axle 17 and carries a sprocket 14. A chain 13 connects the sprockets 12 and 14.

The afore-mentioned shoulder pins 3 and 7 are respectively centered in the gears 4 and 5, and secure a connecting rod 16 to these gears for pivotal movement about the respective gear axes.

The afore-described transmission operates as follows:
The uniform rotary motion of the input gear 1 is transmitted by the eccentric gear 4 to the eccentric gear 5. The effective pitch diameters of the identical gears 4, 5 vary cyclically in opposite directions during each revolution of the input gear 1, and the rotary speed of the gear 5 and of the attached sprocket 12 about the axis of the stub shaft 10 varies accordingly. The rotary motion of the sprocket 12 at cyclically varying speed is transmitted to the sprocket 14 and the output shaft 18 by the chain 13.

The arm 11 pivots cyclically about the axis of the shaft 18 during each revolution of the input wheel 1. The eccentrically mounted gears 4, 5 are held in meshing engagement by the connecting rod 16.

The transmission illustrated and described above is simple in its construction. The spur gears and sprockets employed are staple articles of commerce. Yet, the variation in gear ratio brought about by the eccentric mounting of the gears 4, 5 is much greater than can be achieved with otherwise similar elliptical gears and twice as great as is available with a pair of gear wheels of which one is eccentrically mounted.

The wide variation in output speed during each revolution of the input gear 1 permits a paper sheet to be transported to a printing position at a relatively high average speed, yet to be positioned at a relatively very low speed, if the transmission of the invention is incorporated into a sheet conveying mechanism. The transmission thus contributes to a high accuracy of register in multi-color print making.

What we claim is:
1. A transmission for converting uniform rotary motion into rotary motion of cyclically varying speed comprising, in combination:
  (a) a support;
  (b) an input member and an output member mounted on said support for rotation about respective fixed axes;
  (c) a first gear member mounted on said support for rotation about an axis eccentric relative to said gear member;
  (d) a rocker arm having one end portion secured to said support for pivoting movement about a fixed axis, and a free end portion spaced from said secured end portion.
  (e) a second gear member mounted on said free end portion for rotation about an axis eccentric relative to said second gear member;
  (f) connecting means holding said first and second gear members in meshing engagement; and
  (g) motion transmitting means operatively interposed between said gear members and said input and output members respectively for rotating one of said gear members in response to rotation of said input member, and for rotating said output member in response to rotation of the other gear member.

2. A transmission as set forth in claim 1, wherein said gear members are of equal pitch diameter, and said connecting means hold the centers of said gear members at a fixed distance.

3. A transmission as set forth in claim 2, wherein the axis of rotation of said output member coincides with the axis of pivoting movement of said rocker arm.

4. A transmission as set forth in claim 3, wherein said motion transmitting means include two wheels respectively fastened to said second gear member and to said output member for rotation about the respective axes of said second gear member and of said output member, and an elongated member trained in a closed loop about said wheels.

5. A transmission as set forth in claim 4, wherein said input member is fixedly fastened to said first gear member for joint rotation about said eccentric axis of the first gear member.

References Cited by the Examiner

UNITED STATES PATENTS

| | | | |
|---|---|---|---|
| 1,807,889 | 6/1931 | Belin | 74—393 |
| 2,445,133 | 7/1948 | Cruikshank | 74—25 |
| 2,877,755 | 3/1959 | Danilewicz | 74—393 |
| 2,957,363 | 10/1960 | Ingham, et al. | 74—393 |

DAVID J. WILLIAMOWSKY, *Primary Examiner.*

H. S. LAYTON, *Assistant Examiner.*